US 6,584,221 B1

(12) United States Patent
Moghaddam et al.

(10) Patent No.: US 6,584,221 B1
(45) Date of Patent: Jun. 24, 2003

(54) METHOD FOR IMAGE RETRIEVAL WITH MULTIPLE REGIONS OF INTEREST

(75) Inventors: Baback Moghaddam, Cambridge, MA (US); Henning Biermann, New York, NY (US); Dimitris Margaritis, Pittsburgh, PA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/385,170

(22) Filed: Aug. 30, 1999

(51) Int. Cl.$^7$ .................................................. G06K 9/60
(52) U.S. Cl. ......................... 382/165; 707/6; 382/199; 382/305
(58) Field of Search .......................... 707/3–6; 382/286, 382/199, 305, 171, 180, 164, 210, 165

(56) References Cited

U.S. PATENT DOCUMENTS

| | | | | |
|---|---|---|---|---|
| 5,675,506 A | * | 10/1997 | Savic | 364/509 |
| 5,751,286 A | * | 5/1998 | Barber et al. | 345/348 |
| 5,767,978 A | * | 6/1998 | Revankar et al. | 358/296 |
| 5,987,456 A | * | 11/1999 | Ravela et al. | 707/4 |
| 5,995,115 A | * | 11/1999 | Dickie | 345/441 |
| 6,253,201 B1 | * | 6/2001 | Abdel-Mottaleb et al. | 707/4 |
| 6,363,381 B1 | * | 3/2002 | Lee et al. | 707/6 |
| 2001/0053249 A1 | * | 12/2001 | Krishnamachari | 382/165 |

OTHER PUBLICATIONS

Smith et al. "Local Color and Texture Extraction and Spatial Query". Image Processing, 1996. IEEE Proceedings., International Conference on, vol.: 3, 1996. Pp.: 1011–1014 vol. 3.*

Jähne. "Practical Handbook on image Processing for Scientific Applications". CRC Press, 1997, p. 389–445.*

C. Carlson et al.; "Region–Based Image Querying"; In Proc. IEEE Workshop on Content–Based Access of image and Video Libraries; Jun., 1997.

N. Howe; "Percentile Blobs for Image Similarity"; IEEE Workshop on Content–Based Access of Image and Video Libraries; Jun., 1998.

J. Huang; "Image Indexing Using Color Correlograms"; In Proc. IEEE Conf. on Computer Vision and Pattern Recognition, 1997.

P. Lipson et al.; "Configuration Based Scene Classification and Image Indexing"; In Proc. IEEE Conf. on Computer Vision and Pattern Recognition, 1997.

S. Sclaroff; "ImageRover: A Content–Based Image Browser for the World Wide Web"; In Proc. IEEE Workshop on Content–Based Access of Image and Video Libraries; Jun., 1997.

* cited by examiner

Primary Examiner—Amelia M. Au
Assistant Examiner—Colin LaRose
(74) Attorney, Agent, or Firm—Dirk Brinkman; Andrew J. Curtin

(57) ABSTRACT

A method for representing an image in an image retrieval database first separates and filters images to extract color and texture features. The color and texture features of each image are partitioned into a plurality of blocks. A joint distribution of the color features and a joint distribution of the texture features are estimated for each block. The estimated joint distributions are stored in the database with each image to enable retrieval of the images by comparing the estimated joint distributions.

17 Claims, 5 Drawing Sheets

METHOD FOR IMAGE RETRIEVAL WITH MULTIPLE REGIONS OF INTEREST

FIELD OF THE INVENTION

This invention relates generally to image processing, and more particularly to indexing, searching, and retrieving images by queries on image content.

BACKGROUND OF THE INVENTION

With the proliferation of multi-media, the world-wide web, and digital imaging, there now exists a demand for image management tools, most importantly tools for indexing, searching and retrieving images. This is commonly referred to as "query-by-image-content" (QBIC) or "content-based image retrieval" (CBIR). Existing systems often make use of global attributes such as overall color and texture distributions which ignore the actual composition of the image in terms of internal structures.

Most of the current content-based image retrieval systems rely on global image characteristics such as color and texture histograms, e.g., see Altavista's "Photofinder." While these simple global descriptors are fast and often do succeed in partially capturing the essence of the user's query, global descriptors often fail due to the lack of higher-level knowledge about what exactly was of interest to the user in the query image, i.e., user-defined content. Recently, there has been a gradual shift towards spatially-encoded image representations. Spatially-encoded representations range widely from fixed image partitioning, as in the "ImageRover," to highly local characterizations like the "color correlograms," please see Sclaroff et al. in "Imagerover: A content-based image browser for the world wide web," Proc. IEEE Workshop on Content-Based Access of Image and Video Libraries, June 1997, and Huang et al. in "Image indexing using color correlograms, "Proc. IEEE Conf. on Computer Vision and Pattern Recognition, 1997.

Somewhere in between these two extremes, one can find various techniques which deal with "regions" or "blobs" in the images. For example, "configural templates" specify a class of images, e.g., snow-capped mountain scenes, by means of photometric and geometric constraints. on pre-defined image regions, see Lipson et al. in "Configuration based scene classification and image indexing," Proc. IEEE Conf. on Computer Vision and Pattern Recognition, 1997. Other techniques use automatic blob segmentation and description, see Carson et al. in "Region-based image querying," Proc. IEEE Workshop on Content-Based Access of Image and Video Libraries, June 1997, and Howe in "Percentile blobs for image similarity," Proc. IEEE Workshop on Content-Based Access of Image and Video Libraries, June 1998. Most of these systems require pre-segmented regions.

SUMMARY OF THE INVENTION

The invention provides a method for representing an image for the purpose of indexing, searching, and retrieving images in a multi-media database. The method allows a user to specify "content" to be searched as salient "regions-of-interest" or ROIs. The user also specifies the importance of the spatial relationships of ROIs. The method yields acceptable retrievals that are at least equal to global-based searches, and provides an intuitive interface that is more in tune with the user's notion of "content," thus providing a more powerful image retrieval tool.

More particularly, the invention provides a method for representing an image in an image retrieval database. The method first separates and filters the image to extract texture features. The colors are readily obtained from the pixel values themselves. The color and texture features are partitioned into a plurality of blocks, each block is 16×16 pixels. A joint distribution of the color features and a joint distribution of the texture features are estimated for each block. The estimated joint distributions, expressed as histograms, are stored in the database with the image.

In one aspect, the color features include three color coordinates LUV, and the texture features include three edge measurements: edge magnitude, a rotation invariant Laplacian, and an edge orientation. The edge magnitude is $\log(G^2_x+G^2_y)$, the rotation invariant Laplacian is $G_{xx}+G_{yy}$, and the edge orientation is $\arg(G_x, G_y)$, where $G_x$, $G_y$ and $G_{xx}$, $G_{yy}$ are respectively the first and second derivatives of a Gaussian filter with specified scale $\sigma$ with two parameters used for the scale $\sigma$. In a query image, one or more regions of interest can be specified with a user interface, and joint distributions can be estimated for blocks corresponding to the regions of interest at as above. The query joint distributions can be used to index the database to find matching images. The matching images can be rank ordered. During the matching, the spatial relationship of the regions of interest can be considered in the matching.

DETAILED DESCRIPTION OF THE PREFERRED EMBODIMENTS

Our invention provides a method for retrieving images using local image representations in a bottom-up fashion. Our localized representations can easily be grouped into multiple user-specified "regions-of-interest" (ROIs), and constrained to preserve their relative spatial configuration during retrieval. Our retrieval method leads to a more user-centric, and thus a more powerful image search engine. Our invention's use of spatial information as a critical component of image description and subsequent matching achieves superior results when compared with the prior art.

Image Features and Similarity Metrics

Our image representation and retrieval is based on two key image components. The first component is a set of image features, such as color and texture features. The second component is a similarity metric used to compare the image features.

Most prior art systems use global color histograms to represent the color features of the image. Usually, the global histograms are determined as an output of a set of linear filters at multiple scales. As a result, global color features ignore the spatial layout of color in a query image. Likewise, a single global vector or histogram of texture measures is used to represent textural attributes, such as granularity, periodicity, and directionality. The similarity metric used to compute the degree-of-match between two images is often a Euclidean norm on the difference between two such global color/texture representations. While global feature-based similarity matching has certain desirable properties, e.g., invariance to rotation, it fails to capture the spatial layout and structure of the image. Moreover,. what the user typically thinks of as the "content" is seldom captured by the whole image, or its global properties. Particularly, the content that, that the user is interested in is localized to a specific region-of-interest.

Therefore, according to our invention, a user identifies specific content in the image, as one ore more regions-of-interest (ROIs). The spatial layout of the ROIs can be specified as a search constraint.

Allowing the user to specify a ROI demands a local representation of image structure at a finer resolution in terms of the image blocks described above. Furthermore, regions can be grouped into larger regions, and larger groups can be integrated into to a single global representation of the image.

Generating Local Color and Texture Distributions

Figure 1:
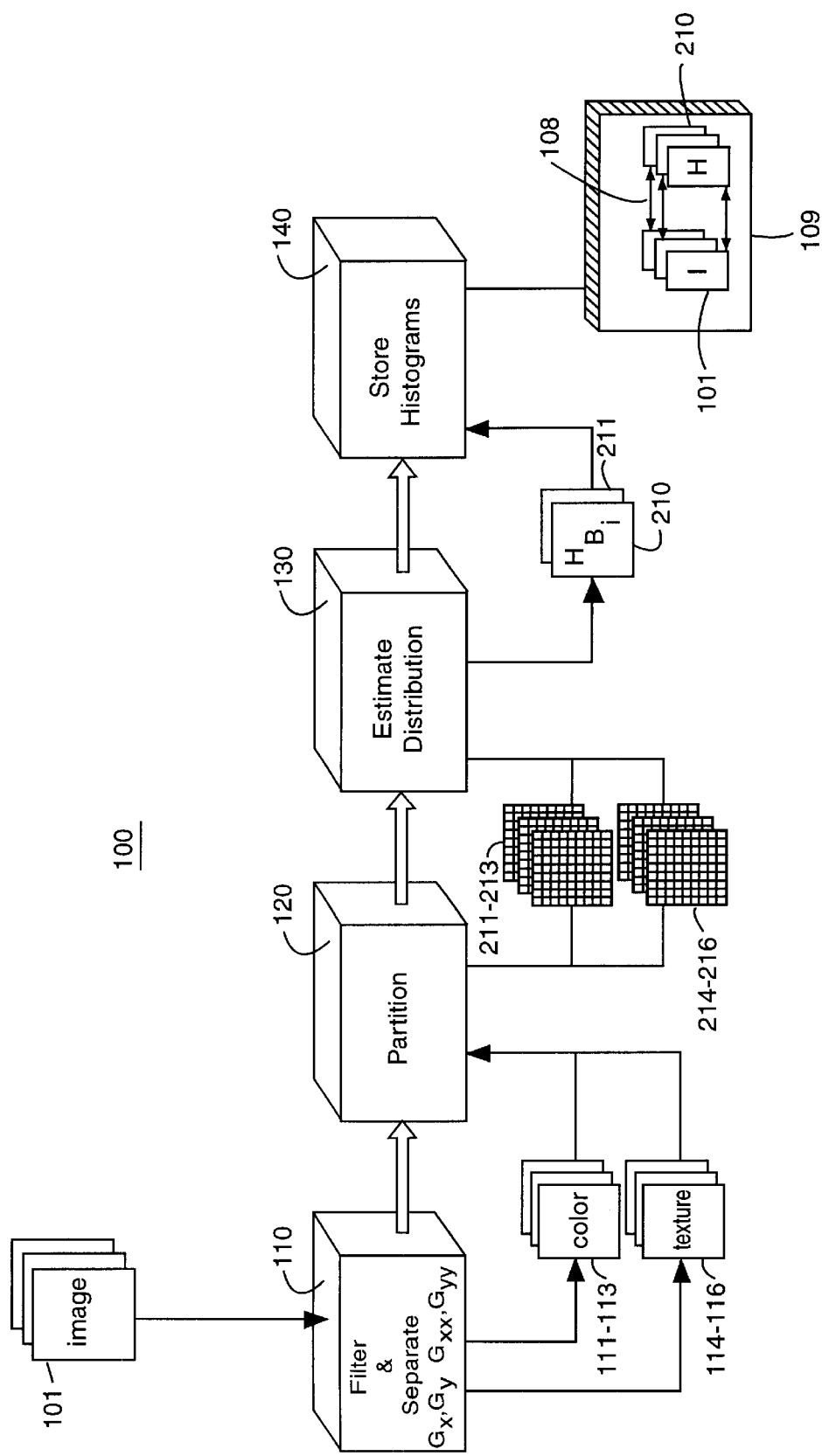
FIG. 1 is a flow diagram of a method for representing images for retrieval purposes according to the invention.

FIG. 1 shows a method 100 for representing images 101 in an image database 109 according to the invention. Each image 101 is processed by step 110 to produce six images 111–116 representing feature distributions, i.e., color and texture. The color images are produced by separating out the color values from the pixels, and filtering is used to extract texture features as described below. The six images include three color images (LUV, RGB, YUV, etc.) 111–113, and three texture images 114–116. In other words the separating and filtering yields three color coordinate and three texture measurements for each pixel of the input image 101.

The texture images respectively express: the edge magnitude: $\log(G^2_x + G^2_y)$, the rotation invariant Laplacian: $G_{xx} + G_{yy}$, and the edge orientation: $\arg(G_x, G_y)$, where $G_x$, $G_y$ and $G_{xx}$ $G_{yy}$ are respectively the $1^{st}$ and $2^{nd}$ derivatives of a Gaussian filter with specified scale σ. Two separate scale parameters can be used: σ=1, and σ=2. The edge magnitude is classified into four values: no edge, weak edge, average edge, and strong edge. Similarly, the edge orientation is classified into four values corresponding to: horizontal, vertical, diagonal left, and diagonal right.

Each parameter yields a set of "independent," or at least uncorrelated texture measurements. This particular texture representation gives reasonable image matching results, however, other texture features, e.g., wavelet pyramid coefficients, can also be used.

Partitioning the Feature Distributions

Figure 2:
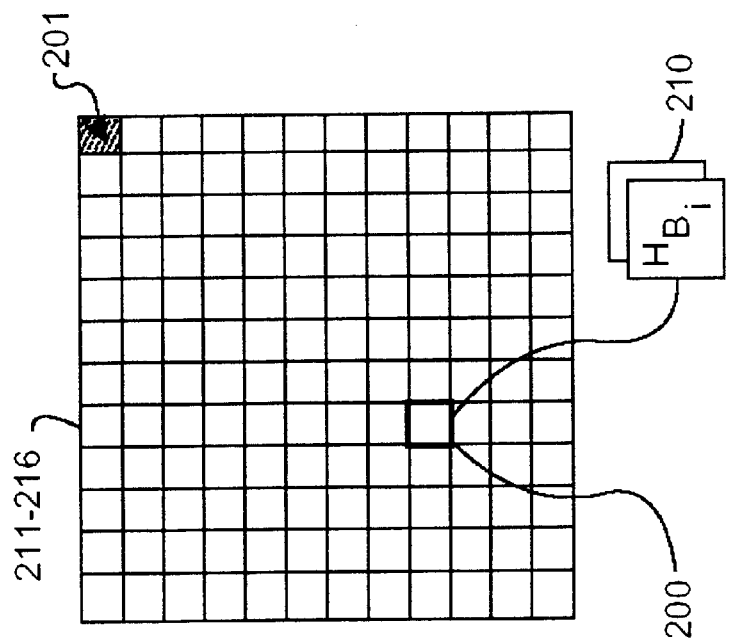
FIG. 2 is block diagram of an image partitioned into blocks.

Next as shown in FIG. 2, we partition 120 each of the images 111–116 into partitioned images 211–216 including blocks 200. The size of each block 200 allows the user to select regions of interest at a finer resolution than available in prior art global representations. We prefer blocks of 16×16 pixels 201, although other different sizes can also be used. The key concept is that the size of the blocks is relatively small with respect to the entire image, e.g., 512×512, or 1280×960, e.g. in the order of $10^{-3}$ of the entire image.

Estimating Joint Distribution

We estimate 130 a joint distribution ($H_{Bi}$) of the color and texture features of each block 200 non-parametrically. The estimation is done by means of a joint 3D histogram 210 in color space, and a joint 3D histogram 211 of texture space.

Our preferred embodiment uses 5-by-5-by-5 bins for the color histograms 210, and 4-by-7-by-4 bins for the texture histograms 211. The texture histograms can be determined at two octave scales, e.g., one scale is double the resolution of the other scale. Note, in both color and texture histograms 210–211, the total number of bins is about 120. For a 16×16 block of 256 pixels, we have roughly two observations per bin.

To aid the estimation process, we use Bayesian m-estimates in counting hits. Baysian m-estimates initialize the bins to ensure valid statistics in case of no observations. We use database-derived prior distributions in order to balance the tradeoff between prior belief and the observed data.

Last, we store the histograms with each respective image in the image database 109. The images and the feature histograms can be linked by pointers 108.

Query by Image Content

Figure 3:
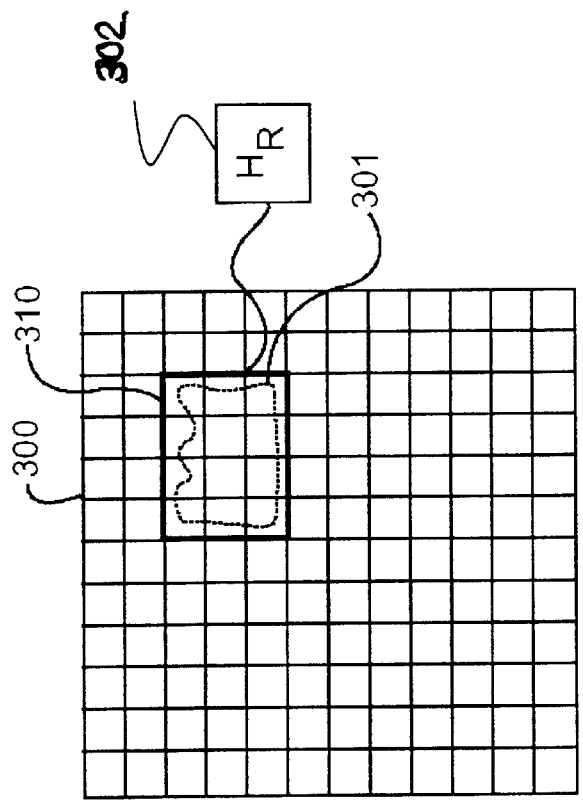
FIG. 3 is a block diagram of an image including a region of interest.

After the database 109 has been constructed, the user can query the database 109 by regions-of-interest as follows. As shown in FIG. 3, the user specifies a region of interest 301 ina query image 300 with a user interface described below. This can be done by using, for example a mouse to outline or "draw" the region of interest 301 in the query image 300. The new query image 300 is separated and filtered, partitioned, and joint distributions are estimated for the blocks 310 fully including the region of interest. Due to the additive property of histograms, the histograms of the blocks 310 can be combined (averaged) to form new histograms. Therefore, the histograms $H_B$ of the underlying R blocks $B_j$ 310 are pooled to represent a meta-block histogram ($H_R$) 302

$$H_R = \frac{1}{|R|} \sum_{B_j \in R} H_{B_j}$$

representing the joint distribution of the region of interest 301. In this example, the region 301 includes R (twelve) blocks. It should be noted that the entire image 300 can be selected as the region-of-interest. In this case, the summed histograms become a global histogram.

The meta-histogram 302 is used to index into the database 109, where an online search for the best matching region of the same size, e.g., 4×3 blocks, is conducted using the following similarity metrics.

Histogram Similarity Measures

We have implemented three different histogram similarity measures for our image representation. The measures are histogram intersection as described by Swain et al. in "Color indexing. International Journal of Computer Vision," 7(1): 11{32, 1991, chi-squared statistic, see Papoulis in "Probability, Random Variables, and Stochastic Processes," McGraw Hill, 1991, and Bhattacharyya distance, see Fukunaga in "Introduction to Statistical Pattern Recognition," Academic Press, 1971.

Each similarity measure has a well-defined probabilistic interpretation, in contrast to Euclidean distance norms on global histograms prevalently used in the prior art. All three measures were are useful with different types of databases, consequently all three are made. available to the user in the query interface 620 of FIG. 6 described below.

Multiple Regions of Interest

Figure 4:
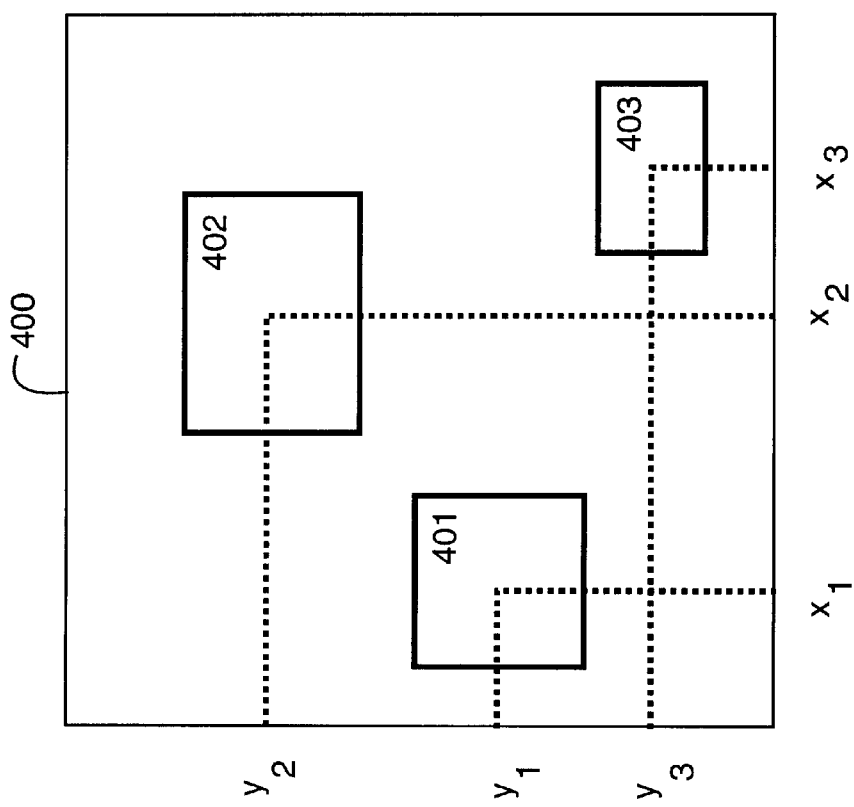
FIG. 4 is a block diagram of an image with multiple regions of interest.

As shown in FIG. 4, the user can select multiple regions 401–403 in a query image 400. In this case, the multiple queries are processed in parallel and the best region match scores are then combined, for example by summation, to determine the final similarity score used for ranking the database matches.

To speed up the search, the list of images 101 in the entire database 109 are first "pruned" to select a small subset, typically 5–10%, of "compatible" images using fast global histogram indexing and a branch and bound algorithm. The key observation is that we can find. lower bounds for the query distances using pooled-ROI and global histogram comparisons.

Consider a query region histogram $H^q_R$, and a database test image with candidate regions $H^t_R$, and a global histogram $H^t$. With a distance metric based on histogram intersection, we can compute an exact lower bound on the region-to-region distance as:

$$H^q_R \perp H^t_R \leq H^q_R \perp H^t \ldots \text{ for any } H^t_R$$

Since similarity (inverse distance) is simply a count of the number of pixels in common, the similarity between the query image 400 and the global test image can never be smaller than the similarity between the query region and a corresponding subregion in the test image. For other metrics such as Chi-squared and Bhattacharyya, exact lower bounds are difficult to obtain. Nevertheless, approximate lower bounds like the region-to-region distance above can be of practical use. Ultimately, no matter what metric is used, there is no reason to search a candidate test image whose global histogram has little in common with the query region's histogram, hence, we prune.

Once the database 109 is sufficiently pruned, a search is made for all combinations of regions in the target image in order to find the best matching regions. This is potentially very slow but the user is expected to specify only few ROIs.

Spatial Configuration of Regions of Interest

Figure 5:
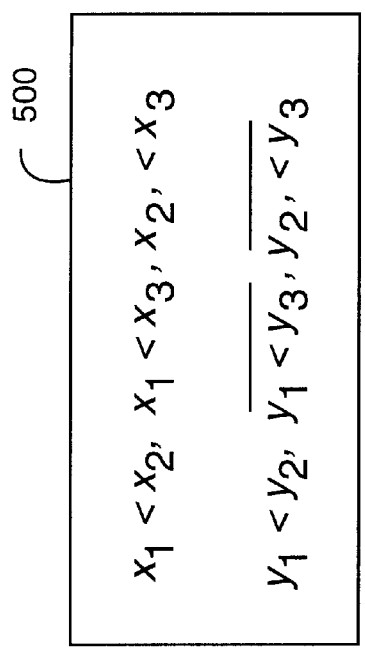
FIG. 5 is a block showing spatial constraints of the regions of FIG. 4.

In addition to querying by visual similarity, the user also has the option of specifying whether selected regions should maintain their respective spatial configuration in the retrieved images that match as shown in FIG. 4. We use a formulation based on the consistency of binary relations 500 on the centroid coordinates $(x_i, y_i)$ of the regions, as illustrated in FIG. 5 where the bar above the coordinates indicates "not."

For a user-defined query Q, consisting of n regions, the spatial configuration similarity to a candidate configuration T, with corresponding best matching $$S(Q,T) = \sum_{i=1}^{n-1} \sum_{j=i+1}^{n} (x_i^t - x_j^t)\mathrm{sign}(x_i^q - x_j^q) + f(y_i^t - y_j^t)\mathrm{sign}(y_i^q - y_j^q)$$

regions, is uniquely given by:

where $x^q_i$ and $x^t_i$ are the region centroid coordinates of the query Q, and candidate T, respectively.

The function $f$ is a bipolar sigmoid (e.g., a hyperbolic tangent). The product of the function $f$ with the sign function will essentially result in a "fuzzy" or "soft" count of the total number of satisfied constraints (in the set of binary relations) between Q and T. The scale parameter of the sigmoid function $f$ can be adjusted to specify how strictly a binary constraint is imposed. In the limit, the function $f$ can be made into a sign function as well.

We note that this formulation is an approximate spatial similarity measure as it assumes that the x and y coordinates of a region can be treated independently in determining the correct spatial relativity of two regions.

Nevertheless, the formulation is quick and easy to compute and adequate for measuring similarity of spatial configurations. Finally, we note that the spatial similarity score is typically combined by weighted summing with the visual similarity score of all the regions to obtain a single final score by which the candidate entries in the database are ranked.

Figure 6:
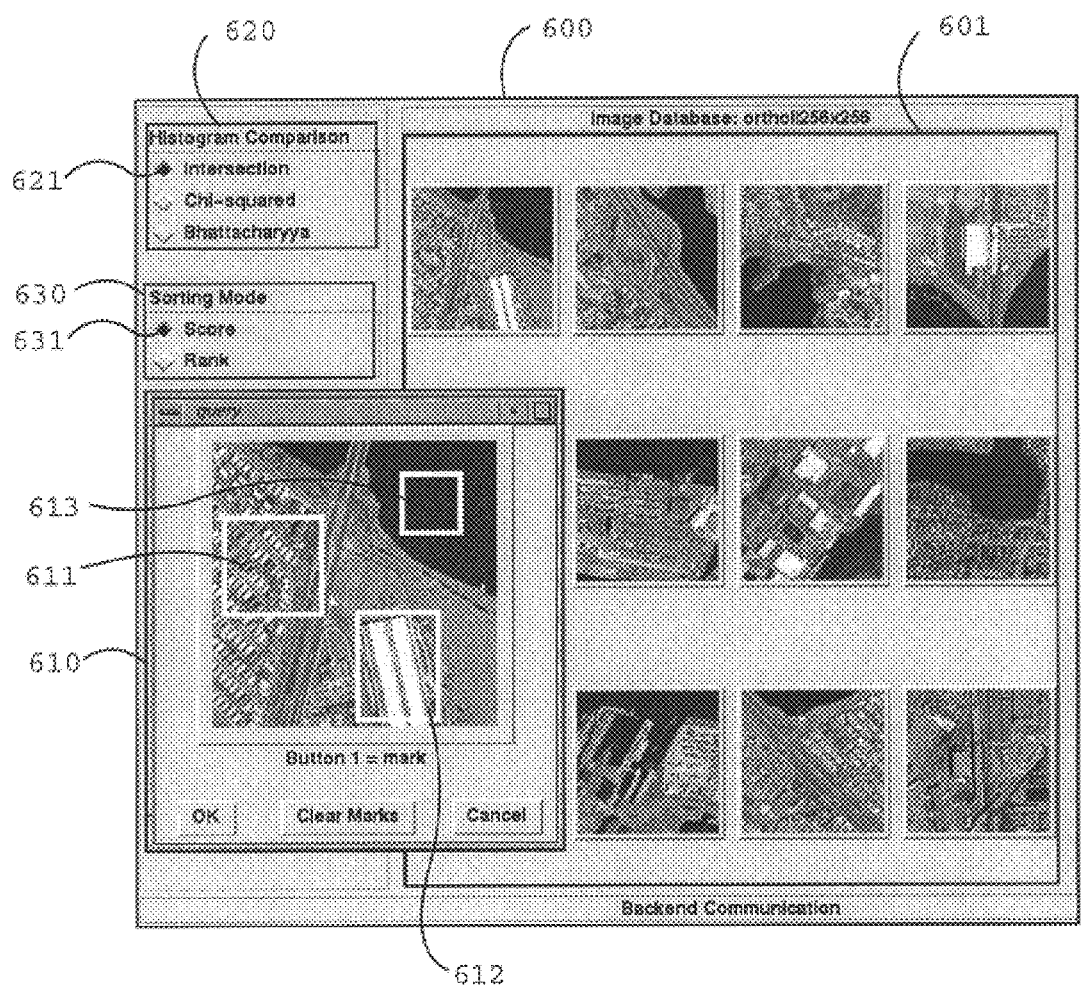
FIG. 6 is a window showing a user interface for querying an image database.

FIG. 6 shows a browser interface 600 for querying a database of aerial imagery 601. In window 610, the user has selected three regions of interest 611–613 as outlined by white borders.

In box 620, the user has selected histogram intersection 621 as the similarity metric, and in box 630, the user has selected to sort by score 631 as opposed to rank order.

The regions in this example correspond roughly to "dense urban row housing" 611, "factory" 612, and "water" 613. Note, these "classes" are entirely user-defined. The user can either retrieve images which respect the spatial configuration of the query, or alternatively, disable spatial scoring to simply retrieve images containing similar types of regions.

Figure 7:
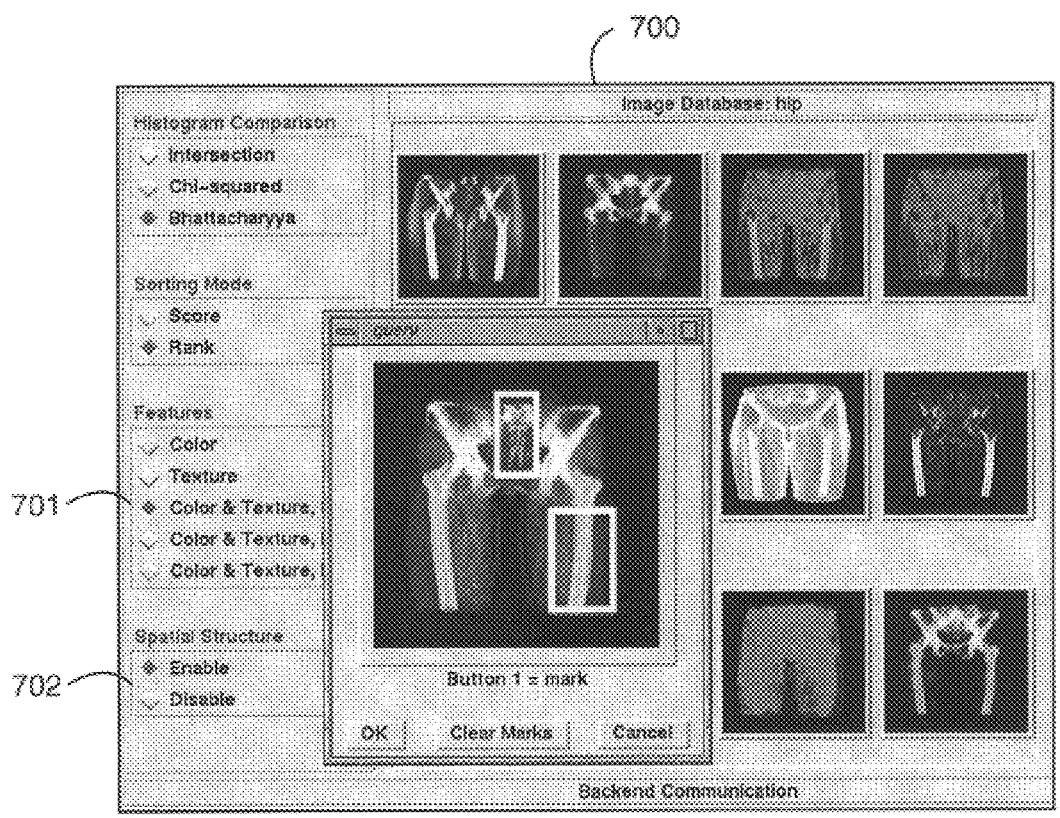
FIG. 7 is another window showing a user interface for querying an image database.

FIG. 7 shows an example of multi-region querying with a database of medical (MRI) images of the human hip 700. Window 701 allows the user to select color and/or texture features to be considered during the matching, and window 701 enables or disables incorporation of the spatial similarity S(P,Q) as defined above in computing the final similarity score.

Our technique is inherently interactive and user-based, thus requiring a uman in the loop. In other words, "content" is no longer defined by the unique and fixed global attributes of database images, but rather by user-defined queries all of which can exist within a single image.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for representing an image in an image retrieval database, comprising the steps of:

filtering the image to extract texture features, wherein the texture features include three edge measurements and wherein the three edge measurements are an edge magnitude, a rotation invariant Laplacian, and an edge orientation;

separating the image to extract color features, wherein the color features include three color coordinates;

partitioning the color and texture features into a plurality of blocks;

estimating a joint distribution of the color features and a joint distribution of the texture features of each block; and storing the estimated joint distributions in the database with the image;

filtering and separating a query image to extract color and texture features of the query image;

partitioning the color and texture features of the query image into a plurality of blocks;

estimating a joint distribution of the color features and a joint distribution of the texture features of the query image;

specifying a region of interest in the query image by outlining with a user interface;

summing the joint distributions of the color and texture features corresponding to the specified region of interest; and indexing the database with the summed joint distributions to locate a matching image for the query image.

2. The method of claim 1 wherein the edge magnitude is $\log(G_x^2+G_y^2)$, the rotation invariant Laplacian is $G_{xx}+G_{yy}$, and the edge orientation is $\arg(G_x, G_y)$, where $G_x$, $G_y$ and $G_{xx}$, $G_{yy}$ are respectively the first and second derivatives of a Gaussian filter with specified scale $\sigma$.

3. The method of claim 2 wherein two or more parameters are used for the scale $\sigma$ to yield a multi-resolution representation of the texture features.

4. The method of claim 1 wherein the edge magnitude is classified into four values as no edge, weak edge, average edge, and strong edge, and the edge orientation is classified into four values as horizontal, vertical, diagonal left, and diagonal right.

5. The method of claim 1 wherein each block is three orders of magnitude smaller than the image.

6. The method of claim 1 wherein each block is 16×16 pixels.

7. The method of claim 1 wherein the joint distributions are expressed as histograms.

8. The method of claim 7 wherein the histograms are determined at two octave scales.

9. The method of claim 1 wherein the joint distribution for each block is $H_B$ and a summed joint distributions of R blocks $B_j$ of the region of interest is $$H_R = \frac{1}{|R|} \sum_{B_j \in R} H_{B_j}.$$

10. The method of claim 1 wherein the matching uses histogram intersection.

11. The method of claim 1 wherein the matching uses chi-squared statistic.

12. The method of claim 1 wherein the matching uses Bhattacharyya distance.

13. The method of claim 10 wherein multiple regions of interest are specified in the query image.

14. The method of claim 10 wherein a global joint distribution is estimated for each image and the query image, and the database is first pruned according to matching the global histogram of the query image with the global histograms of the image before the indexing.

15. The method of claim 14 wherein the database is pruned according to a lower bound.

16. An image retrieval system comprising:

means for separating and filtering an image to extract color and texture features associated with each image, wherein the texture features include three edge measurements and wherein the three edge measurements are an edge magnitude, a rotation invariant Laplacian, and an edge orientation and wherein the color features include three color coordinates;

means for partitioning the color and texture features of each image into a plurality of blocks;

means for estimating a joint distribution of the color features and a joint distribution of the texture features of each block of each image; and a memory storing the estimated joint distributions with each image;

means for separating and filtering a query image to extract color and texture features of the query image, and a joint distribution of the color features and a joint distribution of the texture features of the query image is specified;

a user interface specifying a region of interest in the query image;

an adder summing the joint distributions of the color and texture features corresponding to the specified region of interest; and means for indexing the database with the summed joint distributions to locate a matching image for the query image.

17. An image retrieval system comprising:

a user interface configured to specify a region of interest in a query image by outlining;

means for estimating a joint distribution of color features and a joint distribution of texture features of the region of interest, wherein the texture features include three edge measurements and wherein the three edge measurements are an edge magnitude, a rotation invariant Laplacian, and an edge orientation and wherein the color features include three color coordinates;

an adder summing the joint distributions of the color and texture features corresponding to the region of interest; and means for indexing a database of stored images with the summed joint distributions to locate a matching image in the database for the query image.

* * * * *